United States Patent [19]

Hall

[11] 4,308,360

[45] Dec. 29, 1981

[54] PROCESS FOR OBTAINING NARROW MOLECULAR WEIGHT DISTRIBUTION IN VINYL AROMATIC MASS POLYMERIZATION SYSTEM

[75] Inventor: Richard A. Hall, Naperville, Ill.

[73] Assignee: Standard Oil Company (Indiana), Chicago, Ill.

[21] Appl. No.: 186,965

[22] Filed: Sep. 15, 1980

[51] Int. Cl.³ .............................................. C08F 2/02
[52] U.S. Cl. .................................... 525/285; 525/286; 525/289; 525/296; 525/297; 525/306; 525/307; 526/73
[58] Field of Search .................. 526/73; 525/285, 286, 525/289, 296, 297, 306, 307

[56] References Cited

U.S. PATENT DOCUMENTS 3,919,354  11/1975  Moore et al. ........................ 525/285
3,945,976   3/1976  McCurdy et al. .......... 260/33.6 AQ

*Primary Examiner*—Stanford M. Levin
*Attorney, Agent, or Firm*—Wallace L. Oliver; William T. McClain; William H. Magidson

[57] ABSTRACT

In a process for the mass polymerization of vinyl aromatic monomer wherein vinyl aromatic monomer is polymerized in successive stages of increasing temperature, the improvement which narrows the molecular weight distribution of the resulting polymer comprising incorporating a crosslinking agent into a polymerizing mass at a point where about 60 to about 95% of monomer is converted to polymer.

11 Claims, No Drawings

PROCESS FOR OBTAINING NARROW MOLECULAR WEIGHT DISTRIBUTION IN VINYL AROMATIC MASS POLYMERIZATION SYSTEM

BACKGROUND OF THE INVENTION

This invention relates to vinyl aromatic polymers and, more particularly, to altering the molecular weight distribution in the manufacture of such polymers.

In a mass thermal process for the polymerization of vinyl aromatic polymer, especially styrene polymer, the polymer produced typically has a broad molecular weight distribution and a low number average molecular weight ($\overline{Mn}$) compared to polymers formed by solution or suspension processes. One such mass thermal polymerization process is described in U.S. Pat. No. 3,945,976 incorporated herein by reference.

It has been observed that styrene polymers having an increased number average molecular weight and a narrow molecular weight distribution, as measured by the ratio of the weight average molecular weight ($\overline{Mw}$) to number average molecular weight, show better processability characteristics when converted to shaped articles. Apparently, a narrow molecular weight distribution gives a high viscosity at high shear rate which leads to a higher extruder output. It is an object of this invention to increase the number average molecular weight in vinyl aromatic polymers produced by a mass thermal process.

SUMMARY OF THE INVENTION

In a process for the mass polymerization of vinyl aromatic monomer wherein vinyl aromatic monomer is polymerized in successive stages of increasing temperature, the improvement which narrows the molecular weight distribution of the resulting polymer comprising incorporating a crosslinking agent into a polymerizing mass at a point where about 60 to about 95% of monomer is converted to polymer.

BRIEF DESCRIPTION OF THE INVENTION

The process of this invention can be practiced in the production of vinyl aromatic polymer, preferably styrene polymer. Examples of typical styrene polymer produced using this process include styrene homopolymer, sometimes called "crystal polystyrene" and rubber-modified styrene polymer, sometimes referred to as "high impact polystyrene."

In the process of this invention certain additives are introduced into a vinyl aromatic mass polymerization system before complete polymerization. Such additives are agents which are known to crosslink vinyl aromatic polymers. Suitable crosslinking agents useful in this invention are compounds with dual functionality which show crosslinking characteristics as observed in the crosslinking test in Boundy and Boyer, "The Polymerization of Styrene" pp. 173-174. According to Boundy and Boyer, crosslinking tests are carried out by placing 0.2 gram of benzoyl peroxide, (reagent grade) in a $\frac{5}{8} \times 6$-in. soft glass test tube and adding 5 grams (5.5 ml) of the styrene monomer containing about 0.005 to 0.1 gram of a suspected crosslinking component. The mixture is heated on a steam bath for sixteen hours leaving the test tube unstoppered. The test tube is cooled and the glass broken away. The polymer is then ground in a mortar and 1 gram of the polymer placed in a 50-ml beaker. Five ml of reagent-grade benzene is added and the mixture is allowed to stand for two hours. At the end of this time the polymer should be completely dissolved. Any insoluble polymer indicates the presence of a crosslinking component. Examples of suitable crosslinking agents include divinylbenzene, N-(iso-butoxymethyl) acrylamide and glycidyl methacrylate. Other crosslinking agents include p,p'-divinylbiphenyl, p,p'-diisopropenylbiphenyl, vinyl methacrylate, acrylic anhydride, allyl methacrylate, diallyl meleate, diallyl itaconate, diallyl diglycolate, allyl cinnamate, divinylnaphthalene, and monoallyl maleate.

In the process of this invention crosslinking additives generally are added in a suitable compatible solvent, such as ethylbenzene or toluene, into a partially polymerized vinyl aromatic during or after the last stage of polymerization. Typically, such additives are added when about 60 to 95% of monomer is converted to polymer and preferably when about 80–90% of monomer is so converted. Preferably, additives are injected into a polymerized mixture before a post reaction heating stage in a manner which produces good mixing. Alternatively, these additives can be added with mixing after the final reactor. Additives are incorporated into such a polymer system in such amount as to lower effectively the weight average molecular weight/number average molecular weight ($\overline{Mw}/\overline{Mn}$) ratio of the final devolatilized polymer. Typically between about 0.01 and about 3 wt.%, preferably between about 0.05 to about 1.5 wt.%, of such additives are so incorporated based on vinyl aromatic polymer.

The process of this invention can be practiced in a continuous or batch mass polymerization system, although a continuous system is typically used commercially. In a continous process, monomer is polymerized as it proceeds through a plug-flow, multiple-stage reactor system. Typically, in a continuous process a monomer is introduced into a first stage where free radical polymerization begins either thermally or by use of a polymerization initiator. As polymerization continues, the polymerizing mass is pumped into one or more additional reactors in which varying temperature-agitation levels are maintained. As the first polymerizing mass travels through the series of reactors, the temperature increases while the agitation rate decreases. Typically, the final polymerization stage need not be agitated. A continuous process can be simulated by a batch reactor programmed to increase temperature and decrease agitation rate as a function of time.

In the production of rubber-modified vinyl aromatic polymer in a continuous, plug-flow, multiple-stage system, a solution of vinyl aromatic monomer and rubber are polymerized with agitation in multiple polymerization zones. After the polymerization begins, the system separates into two phases. Initially, the rubber in styrene is present in the larger amount and is the major or continuous phase. As the reaction proceeds and more polystyrene is formed, a phase inversion occurs whereupon the polystyrene in styrene becomes the continuous phase. At the phase inversion point the system must be agitated sufficiently to disperse the polystyrene-grafted rubber phase into roughly spherical particles which act to reinforce an otherwise brittle polystyrene matrix. Typically, polymerization is continued to a level in the last reactor stage such that that up to about 95 percent of monomer has been converted to polymer, although about 80 to 90% conversion is preferred. Typically, polymeric material removed from the last reactor stage is devolatilized to remove residual monomer. Sufficient agitation is maintained in the first two reactor stages to disperse rubber particles adequately within the polymerizing mass. Typically, the last stage need not be agitated. The level of agitation required in a specific reactor system can be optimized readily by routine experimentation.

Rubbers which can be used in this invention include polybutadiene (PBD) and styrene-butadiene (SBR) rubbers. Typically useful PBD rubbers are linear and branched polymers of butadiene containing from 25 to 99 percent cis content with less than 20 percent free vinyl unsaturation (i.e., 1, 2-addition). A commonly used PBD would contain about 35 percent cis and about 14 percent free vinyl unsaturation. Solution viscosities for useful PBD's range from 25 to 220 centipoise and preferably range from 70 to 190 centipoise measured at a concentration of 5 percent by weight in styrene at 30° C. Useful SBR rubbers are random or block copolymers of butadiene and styrene, or combinations thereof, with 5 to 50 percent bound styrene. Typical solution viscosities are 20 to 190 centipoise and typical Mooney viscosities are 30 to 120. These rubbers can be present in styrene polymers at levels from about 2 to 20 percent and typically from about 3 to 10 percent.

Although the preferred polymerization system contains three reactor stages, the number of stages can be varied as long as the sequence of temperature ranges and agitation substantially is maintained.

In addition to vinyl aromatic monomer and rubber, up to about 10 percent of other materials can be included in the polymerization feedstock, such as stabilizers, antioxidants, colorants, flame retardants, and lubricants.

This invention is demonstrated but not limited by the following Examples.

EXAMPLE I

In a batch simulation of a continuous process, styrene was partially polymerized in a one-half gallon Chemco stainless steel reactor fitted with a valve through which molten polymer can be withdrawn, a four-blade agitator and an internal cooling coil. A feedstock comprising styrene monomer was polymerized in such a reactor with time-temperatue-agitation cycles being (a) 2.27 hours at 127° C. at 40 rpm, (b) 2.27 hours at 142° C. at 10 rmp, and (c) 1.13 hours at 170° C. at 10 rpm. After partial polymerization, product containing about 90.2% polymer and 9.8% monomer was chopped. Two batches of such chopped prepolymer were dry blended and then returned to the reactor together with 1.0 wt.% of N-(iso-butoxymethyl) acrylamide. The resulting mixture was heated to 179° C. over one hour and then heated to 210° C. over one-half hour. A Control run (A) was performed without using N-(iso-butoxymethyl) acrylamide. The results of these experiments are shown in Table I.

TABLE I

| | Pre-Polymer | Control A | Example I |
|---|---|---|---|
| Volatiles (% Styrene) | | | |
| Before devolatilization | 9.8 | 4.1 | 4.5 |
| After devolatilization | — | 0.028 | 0.017 |
| Conversion (%) | 90.2 | 96 | 96 |
| Melt Flow Rate (g/10 min.) | — | 3.7 | 3.9 |
| Methanol Solubles | — | 0.88 | 2.0 |
| Heat Distortion Temp. (°C.) | — | 86 | 84 |
| Vicat Softening Point (°C.) | — | 107 | 107 |
| Molecular Weight | | | |
| $\overline{M}n$ | 111,600 | 79,200 | 97,100 |
| $\overline{M}w$ | 286,600 | 263,100 | 271,200 |
| $\overline{M}w/\overline{M}n$ | 2.6 | 3.3 | 2.8 |

EXAMPLES II-IV

A series of styrene polymerizations were performed in a continuous polymerization unit similar to that described in U.S. Pat. No. 3,945,976, having three reactors. A solution of crosslinking agent (33 wt.% in toluene) was added to the prepolymer melt stream after the third reactor using a Lapp pump calibrated to deliver a desired amount of additive. The resulting mixture of styrene prepolymer and additive was intensively mixed by adding the mixture to the suction side of a gear pump and then transferring the mixture to a devolatilizer. Table II shows the data from two polymerizations using an inhibitor additive and control data for polymer used in such polymerization without additive.

TABLE II

| | Control B | Example II | Example III |
|---|---|---|---|
| Crosslinking Agent (1) | — | IBMA | IBMA |
| Amount of Agent Incorporated into Polymer (wt. %) | — | 0.5 | 1.0 |
| Melt Flow Rate (g/10 min.) | 2.9 | 2.4 | 1.7 |
| Heat Distortion Temp. (°C.) | 87 | 82 | 83 |
| Vicat Softening Point (°C.) | 103 | 104 | 104 |
| $\overline{M}n$ ($\times 10^{-3}$) | 77 | 90 | 94 |
| $\overline{M}w$ ($\times 10^{-3}$) | 275 | 300 | 304 |
| Mw/Mn | 3.6 | 3.3 | 3.2 |
| Residual Styrene (%) | 0.50 | 0.47 | 0.23 |
| Methanol Solubles (%) | 1.2 | 2.5 | 2.0 |

| | Control C | Example IV |
|---|---|---|
| Crosslinking Agent (1) | — | DVB |
| Amount of Agent Incorporated into Polymer (wt. %) | — | 0.1 |
| Melt Flow Rate (g/10 min.) | 3.0 | 2.8 |
| Heat Distortion Temp. (°C.) | 83 | 84 |
| Vicat Softening Point (°C.) | 104 | 107 |
| $\overline{M}n$ ($\times 10^{-3}$) | 89 | 103 |
| $\overline{M}w$ ($\times 10^{-3}$) | 293 | 310 |
| Mw/Mn | 3.3 | 3.0 |
| Residual Styrene (%) | 0.36 | 0.44 |
| Methanol Solubles (%) | 1.5 | 1.8 |

(1) IBMA = N-(iso-butoxymethyl) acrylamide DVB = divinylbenzene

EXAMPLES V-VII

A series of experiments were performed using a procedure similar to that described in Example I. A prepolymer was formed by reacting an agitated mixture of styrene monomer and polybutadiene rubber (Firestone Diene 35) in time-temperature cycles of (a) 2.27 hours at 127° C.; (b) 2.27 hours at 142° C. and (c) 1.13 hours at 170° C. Divinyl benzene in ten milliliters of ethylbenzene was added to chopped prepolymer and the mixture returned to the reactor and heated with agitation at 10 rpm to 170° over one hour and to 210° over one-half hour. Results of these experiments together with control runs are shown in Table III.

TABLE III

|  | Control D(1) | Ex. V | Ex. VI(1) | Control E(1) | Ex. VII |
|---|---|---|---|---|---|
| Styrene (wt. %) | 90.0 | 90.0 | 90.0 | 91.8 | 91.8 |
| Rubber (wt. %) | 8.0 | 8.0 | 8.0 | 7.0 | 7.0 |
| Mineral Oil (wt. %) | 1.8 | 1.8 | 1.8 | 1.0 | 1.0 |
| BHT (wt. %) (3) | 0.2 | 0.2 | 0.2 | 0.2 | 0.2 |
| t-Dodecyl Mercaptan (ppm) | 25 | 25 | 25 | — | — |
| Divinylbenzene (wt. %) | — | 0.05 | 0.1(2) | — | 0.05 |
| Melt Flow Rate (g/10 min.) | 2.0 | 2.5 | 1.7 | 2.6 | 2.5 |
| Heat Distortion Temp. (°C.) | 79 | 79 | 79 | 81 | 82 |
| $\underline{M}n$ ($\times$ $10^{-3}$) | 70.5 | 82.3 | 82.4 | 61.9 | 87.0 |
| $\underline{M}w$ ($\times$ $10^{-3}$) | 240 | 238 | 250 | 235 | 240 |
| Mw/Mn | 3.4 | 2.9 | 3.0 | 3.8 | 2.8 |
| Final Conversion (%) | 90.9 | 93.9 | 93.3 | 94.5 | 94.0 |
| Residual Styrene (%) | 0.16 | 0.12 | 0.24 | 0.15 | 0.15 |

(1) Prepolymer reacted for additional 1.13 hours at 210° C.
(2) Divinylbenzene added prior to the 210° cycle.
(3) Butylated Hydroxy Toluene--antioxidant.

The data show that addition of a crosslinking agent into a partially polymerized vinyl aromatic increases the number average molecular weight and narrows the molecular weight distribution.

What is claimed is:

1. In a process for the mass polymerization of vinyl aromatic monomer wherein vinyl aromatic monomer is polymerized in successive stages of increasing temperature, the improvement comprising incorporating a crosslinking agent selected from the group consisting of divinylbenzene, N-(iso-butoxymethyl) acrylamide, glycidyl methacrylate, p,p'-divinylbiphenyl, p,p'-diisopropenylbiphenyl, vinyl methacrylate, acrylic anhydride, allyl methacrylate, diallyl maleate, diallyl itaconate, diallyl diglycolate, allyl cinnamate, divinylnaphthalene and monallyl maleate into a polymerizing mass at a point where about 60 to about 95% of the vinyl aromatic monomer is converted to polymer.

2. The process of claim 1 wherein the vinyl aromatic monomer is styrene monomer.

3. The process of claim 1 wherein the crosslinking agent is injected into a polymerizing mass as a solution of crosslinking agent in a suitable solvent.

4. The process of claim 1 wherein the crosslinking agent is incorporated into the polymerizing mass with mixing.

5. The process of claim 1 wherein the crosslinking agent is injected into the polymerizing mass at a point where about 80 to about 90% of monomer is converted to polymer.

6. The process of claim 1 wherein the crosslinking agent is incorporated at a point before a final heating stage.

7. The process of claim 1 wherein the crosslinking agent is selected from the group consisting of divinylbenzene and N-(iso-butoxymethyl) acrylamide.

8. The process of claim 7 wherein the crosslinking agent is N-(iso-butoxymethyl) acrylamide.

9. The process of claim 7 wherein the crosslinking agent is divinylbenzene.

10. The process of claim 1 wherein the crosslinking agent is added in an amount of about 0.01 to about 3.0 weight percent of the polymerizing mass.

11. The process of claim 1 wherein a polybutadiene or styrene-butadiene rubber is dissolved in the vinyl aromatic monomer before polymerization.

* * * * *